US008727355B2

(12) United States Patent
Takahashi et al.

(10) Patent No.: US 8,727,355 B2
(45) Date of Patent: May 20, 2014

(54) SEMICONDUCTOR FABRICATION DEVICE WELDED BELLOWS

(75) Inventors: Hidekazu Takahashi, Tokyo (JP); Masahiko Inoue, Tokyo (JP); Hiroyuki Ochiai, Tokyo (JP)

(73) Assignees: Eagle Industry Co., Ltd., Tokyo (JP); EagleBurgmann Japan Co., Ltd., Tokyo (JP)

(*) Notice: Subject to any disclaimer, the term of this patent is extended or adjusted under 35 U.S.C. 154(b) by 0 days.

(21) Appl. No.: 14/110,641

(22) PCT Filed: Mar. 9, 2012

(86) PCT No.: PCT/JP2012/056061
§ 371 (c)(1),
(2), (4) Date: Oct. 8, 2013

(87) PCT Pub. No.: WO2012/147416
PCT Pub. Date: Nov. 1, 2012

(65) Prior Publication Data
US 2014/0035236 A1    Feb. 6, 2014

(30) Foreign Application Priority Data

Apr. 26, 2011 (JP) .................................. 2011-097745

(51) Int. Cl.
*F16J 15/52* (2006.01)
*F16J 3/04* (2006.01)

(52) U.S. Cl.
USPC ........................................................ 277/500

(58) Field of Classification Search
None
See application file for complete search history.

(56) References Cited

U.S. PATENT DOCUMENTS

2004/0221808 A1* 11/2004 Kawano .................... 118/715
2012/0013076 A1*  1/2012 Takahashi .................. 277/391

FOREIGN PATENT DOCUMENTS

| JP | S45-019670 B1 | 7/1970 |
| JP | S58-004848 U1 | 7/1983 |
| JP | S62-251570 A | 11/1987 |
| JP | H04-282499 A | 10/1992 |
| JP | H06-281000 A | 10/1994 |
| JP | H09-072419 A | 3/1997 |
| WO | 2012/147417 A1 | 11/2012 |

OTHER PUBLICATIONS

Notification of Transmittal of Translation of the International Preliminary Report on Patentability (PCT/IB/338) mailed Nov. 7, 2013, with International Preliminary Report on Patentability (PCT/IB/373) and Written Opinion of the International Searching Authority (PCT/ISA/237), for corresponding international application PCT/JP2012/056061.
International Search Report (ISR), mailed May 22, 2012, issued for International application No. PCT/JP2012/056061.

* cited by examiner

*Primary Examiner* — Seahvosh Nikmanesh
(74) *Attorney, Agent, or Firm* — Law Office of Katsuhiro Arai

(57) ABSTRACT

A semiconductor fabrication device welded bellows of an accordion structure is characterized in that a plurality of annular bellows plates having faces curving in a radial direction are connected alternatingly at the outside diameter side and inside diameter side, wherein the annular bellows plates are provided with a treatment-side bellows plate and a non-treatment-side bellows plate, a gas layer disposed between the two bellows plates, the treatment-side bellows plate being of lesser thickness, and the non-treatment-side bellows plate being of greater thickness. The bellows are highly resistant to damage caused by foreign matter; or, in the unlikely case that the treatment-side bellows plate becomes damaged, the damage can be compensated for by the non-treatment side bellows plate.

8 Claims, 6 Drawing Sheets

SEMICONDUCTOR FABRICATION DEVICE WELDED BELLOWS

This application is the U.S. National Phase under 35 U.S.C. §371 of International Application PCT/JP2012/056061, filed Mar. 9, 2012, which claims priority to Japanese Patent Application No. 2011-097745, filed Apr. 26, 2011. The International Application was published under PCT Article 21(2) in a language other than English.

TECHNICAL FIELD

The present invention relates to a welded bellows of accordion shape having sealing performance and flexibility, intended to be employed in a sealed section of a semiconductor fabrication device; and relates, for example, to a welded bellows suitable for sealing a gate valve capable of airtightly opening and closing an aperture of a vacuum treatment chamber.

BACKGROUND ART

Welded metal bellows of accordion shape having sealing performance and flexibility can be compressed until the bellows plates come into close contact, and are accordingly employed for sealing moving parts in various kinds of machines. For example, a welded metal bellows employed for sealing a gate valve capable of airtightly opening and closing an aperture of a vacuum treatment chamber employed in a fabrication step of a semiconductor fabrication device serves to seal off the vacuum side from atmospheric air side, and, as shown in FIG. 4, is formed into an accordion shape by welding together single bellows plates 50 at the inside diameter side and outside diameter side thereof, and is adapted to perform cyclic contracting action at high speed of several million strokes (hereinafter referred to as "Prior Art 1"). In the event that foreign matter present in the vacuum environment, for example, metal particles 51 or the like infiltrates the bellows plates 50 during this time as shown in FIG. 4 (a), owing to the "lever" principle, the bellows plates 50 experience bending deformation as shown by the phantom lines during contraction, and in the course of performing cyclic expansion and contraction, fractures arise in proximity to the metal particle 51 in the bellows plates 50, as shown in FIG. 4 (b), ultimately leading to failure. A resultant problem is that the bellows becomes unusable after an unexpectedly short service life.

Meanwhile, various welded metal bellows have been proposed to date; for example, a welded metal bellows 60 like that shown in FIG. 5 (hereinafter referred to as "Prior Art 2"; see Patent Document 1 for example) is known to have excellent corrosion resistance and operational spring performance. The bellows plates 61 constituting the accordion structure of the bellows 60 of Prior Art 2 are formed as double layers, by disposing austenitic stainless steel sheets 62 to the sealed fluid side, disposing spring steel sheets 63 to the non-sealed fluid side, and affixing them together by welding at the outside diameter side and inside diameter side.

A welded metal bellows 70 like that shown in FIG. 6 (hereinafter referred to as "Prior Art 3"; see Patent Document 2 for example) is known to offer a bellows able to withstand high pressure, without sacrificing the flexibility of the bellows. The bellows plates 71 constituting the accordion structure of the welded metal bellows 70 of Prior Art 3 are formed as double layers of two disks 72, 73 of uniform thickness, affixed by welding at the outside diameter side and inside diameter side. The disks 72 on the atmosphere side are furnished with vent holes 74 so that no gas pockets are present between the disks 72, 73.

However, Prior Art 2 shown in FIG. 5 is intended to offer a welded metal bellows of excellent corrosion resistance and operational spring performance, and takes no measures against cyclic bending deformation caused by infiltration of foreign matter. A resultant problem is that, in a case in which, for example, foreign matter 64 has infiltrated between two bellows plates 62, 62 on the sealed fluid side, the two bellows plates 62, 62 may be subjected to cyclic bending deformation, leading to successive or simultaneous failure of the two bellows plates 62, 62.

Moreover, Prior Art 3 shown in FIG. 6 is intended to offer a bellows able to withstand high pressure, without sacrificing flexibility; and because a vent hole 74 is formed in the bellows plate 72 on the atmosphere side, a resultant problem is that when failure occurs due to cyclic bending deformation of the bellows plate 73 on the opposite side from the atmosphere side caused by infiltration of foreign matter 75, sealing action can no longer be maintained, so in the end, the life is no better than in the case of a single bellows plate.

CITATION LIST

Patent Literature

Patent Document 1: Japanese Laid-Open Utility Model Application 58-4848
Patent Document 2: Japanese Examined Patent Application Publication 45-19670

SUMMARY OF INVENTION

Technical Problem

With a view to solving the problems in the aforedescribed prior art, it is an object of the present invention to offer a semiconductor fabrication device welded bellows in which the bellows plates have a double-layer structure, wherein, of the two bellows plates, only the treatment-side (vacuum) bellows plate is adapted to readily deform in a supple manner, whereas the non-treatment-side (atmospheric air) bellows plate is endowed with the function of a sealing/reinforcing member; and to thereby offer a welded bellows having redundancy, such that it is highly resistant to damage caused by foreign matter, or in the unlikely case that the treatment-side bellows plate becomes damaged, the damage can be compensated for by the non-treatment side bellows plate.

Solution to Problem

To attain the aforedescribed object, the semiconductor fabrication device welded bellows of a first aspect of the present invention resides in a semiconductor fabrication device welded bellows of an accordion structure in which a plurality of annular bellows plates having faces curving in the radial direction are connected alternatingly at the outside diameter side and inside diameter side, characterized in that the annular bellows plates are provided with a treatment-side bellows plate and a non-treatment-side bellows plate, a gas layer being disposed between the two plates, the treatment-side bellows plate being of lesser thickness, and the non-treatment-side bellows plate being of greater thickness.

According to a second aspect, the semiconductor fabrication device welded bellows of the first aspect of the present invention is characterized in that the treatment side is a vacuum, and the non-treatment side is atmospheric air.

According to a third aspect, the semiconductor fabrication device welded bellows of the first or second aspect of the present invention is characterized by being employed for sealing a gate valve capable of airtightly opening and closing an aperture of a vacuum treatment chamber employed in a fabrication step of a semiconductor fabrication device.

According to a fourth aspect, the semiconductor fabrication device welded bellows of any of the first to third aspects of the present invention is characterized in undergoing an action of expansion and contraction over several hertz, the expansion-contraction rate being 100 mm/sec or greater, and the cycle life being $1 \times 10^6$ or more.

Advantageous Effects of Invention

The present invention affords the following advantageous effects.

(1) There can now be offered a welded bellows having redundancy, making it highly resistant to damage to the treatment-side bellows plate caused by foreign matter, and in the unlikely case that the treatment-side bellows plate becomes damaged, the damage can be compensated for by the non-treatment side bellows plate.

(2) The treatment-side bellows plate is used as a "disposable" sheet material that fulfills the role of preventing failure of the non-treatment-side bellows plate, while the non-treatment-side bellows plate fulfills the role of a sealing/reinforcing member to serve as the primary bellows plate, thereby offering a welded bellows that can withstand use for extended periods.

(3) Because the treatment-side bellows plate is thinner and because a gas layer of air, Ar gas, or the like is present to the back thereof, the plate can conform in a supple manner to foreign matter, and is therefore itself highly resistant to failure; moreover, due to the intervening gas layer, substantially none of the bending deformation experienced by the treatment-side bellows plate due to infiltrating foreign matter is transmitted to the non-treatment-side bellows plate, and therefore failure of the non-treatment-side bellows plate can be prevented as well.

DESCRIPTION OF EMBODIMENTS

While the following detailed description of the embodiment of the semiconductor fabrication device welded bellows according to the present invention makes reference to the drawings, that present invention should not be construed as being limited thereto, and various modifications, alterations, and improvements based on the experience of a person skilled in the art may be made without departing from the scope of the present invention.

Figure 1:
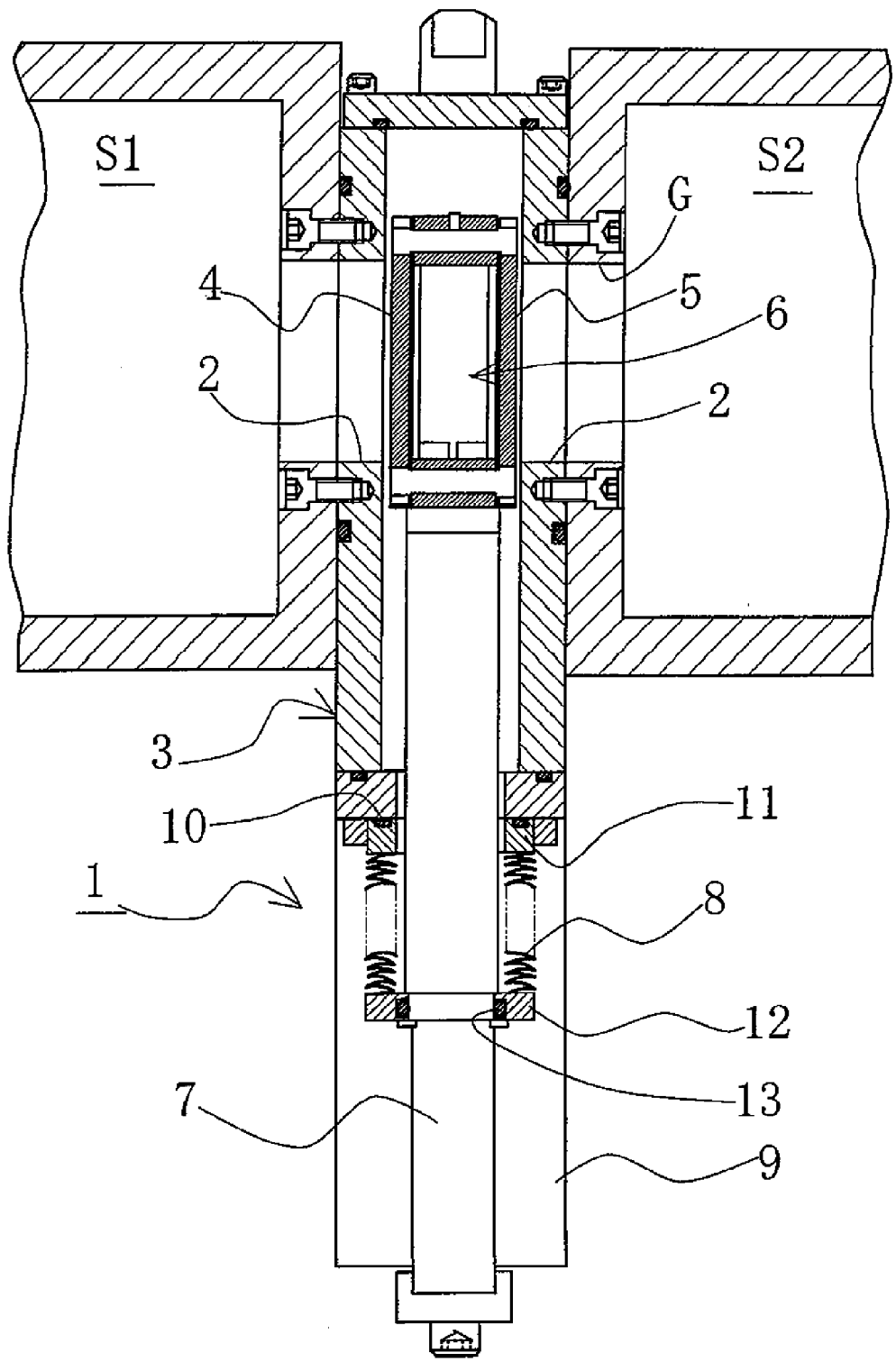
FIG. 1 is a major part cross sectional view of a semiconductor fabrication device welded bellows according to an embodiment of the present invention, when employed for sealing of a support rod of a gate valve capable of airtightly opening and closing an aperture of a vacuum treatment chamber employed in a fabrication step of a semiconductor fabrication device.

FIG. 1 is a major part cross sectional view of a semiconductor fabrication device welded bellows according to an embodiment of the present invention, when employed for sealing of a support rod of a gate valve capable of airtightly opening and closing an aperture of a vacuum treatment chamber employed in a fabrication step of a semiconductor fabrication device.

In FIG. 1, a gate valve 1 has a valve box 3 in which through-holes 2 are formed at mutually opposing positions; a valve assembly 6 having a pair of valve plates 4, 5, and disposed inside the valve box 3; a support rod 7 that supports at the distal end thereof the valve assembly 6; a bellows 8 that seals the valve box 3 side and the support rod 7 side; and an air cylinder 9 that moves the valve assembly 6 between the open valve position and the closed valve position via the support rod 7.

The gate valve 1 is furnished, for example, between vacuum treatment chambers S1, S2 in a semiconductor fabrication step. The valve assembly 6 is moved between the open valve position and the closed valve position by the support rod 7, and with the valve assembly 6 positioned at the closed valve position, compressed air is supplied or evacuated by an air supply device or vacuum pump, not illustrated, pushing the pair of valve plates 4, 5 towards or releasing them from the perimeters of the through-holes 2, whereby it is possible to open or close the gate G of the vacuum treatment chambers S1, S2.

The bellows 8 of the gate valve 1 according to the present embodiment is a metal member for sealing the valve box 3 side and the support rod 7 side. For example, the bellows 8 is fastened at one end thereof by a fastening member or the like, or joined by welding or the like, in a state such that airtightness is maintained, to an upper ring member 11 which is secured to the bottom plate of the valve box 3, interposed by an O-ring 10. The other end of the bellows 8 is likewise fastened by a fastening member or the like, or joined by welding or the like, for example, to a lower ring member 12 fastened in mated fashion to the support rod 7. Additionally, there is an intervening O-ring 13 between the lower ring member 12 and the support rod 8, whereby the valve box 3 can be kept sealed even when the support rod 7 moves up and down, making it possible to prevent contaminant foreign matter such as foreign particles or the like from infiltrating from the outside.

In a semiconductor fabrication step, when the internal pressure of a treatment chamber is changed to a normal pressure or a reduced pressure state by supplying or discharging a purge gas, accumulated matter (in the present invention, sometimes referred to as "foreign matter") that has become deposited on the walls or other portions of the treatment chamber rises, and the foreign matter may enter the interior of the bellows 8. Because the foreign matter has a maximum diameter size of about several hundred microns (for example, about 0.5 to 0.6 mm), once the foreign matter infiltrates the interior of the bellows 8, during expansion and contraction, the bellows plates of the bellows experience bending deformation on the "lever" principle with the foreign matter as the fulcrum, and are subjected to cyclic bending stress. The bellows 8 of the gate valve 1 according to the present embodiment undergoes expanding-contracting action in a range of several hertz, and must be able to withstand expanding-contracting action at an expansion-contraction rate of 100 mm/sec or greater, for a cycle life of $1\times10^6$ or greater. With welded bellows constituted as in the aforedescribed prior art, it has been difficult to avoid failure.

Figure 2:
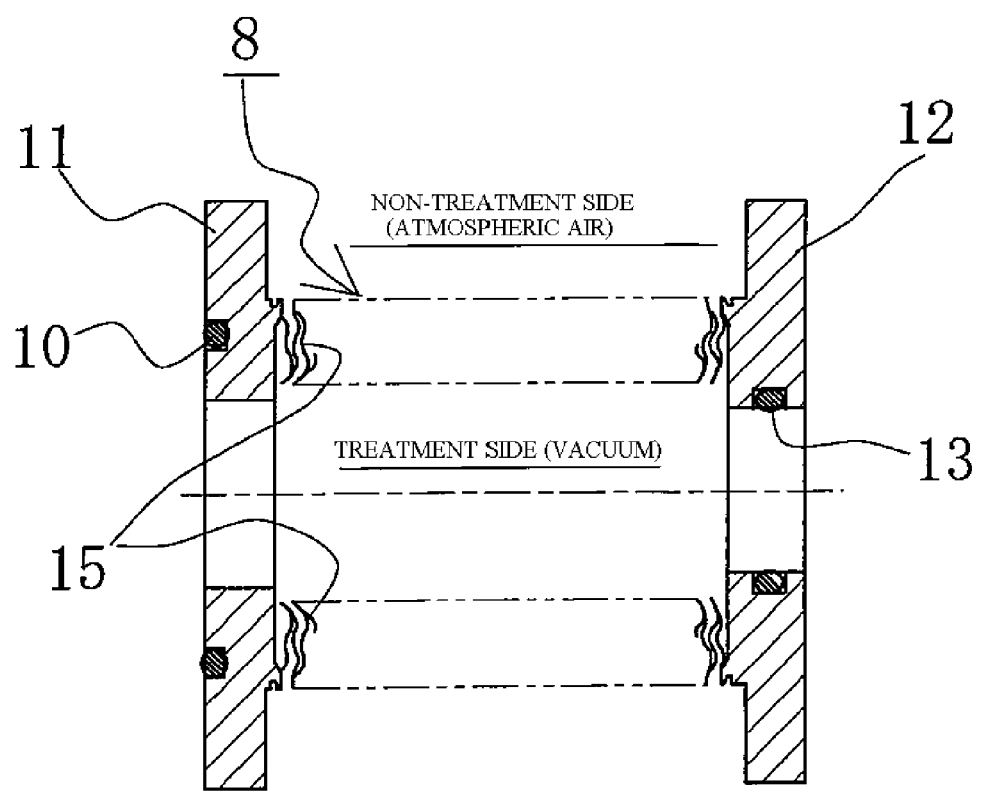
FIG. 2 is a cross sectional view showing the overall constitution of the semiconductor fabrication device welded bellows according to an embodiment of the present invention.

FIG. 2 is a cross sectional view showing the overall constitution of the semiconductor fabrication device welded bellows according to the embodiment of the present invention.

In FIG. 2, the bellows 8 is formed in an accordion structure in which a plurality of annular bellows plates 15 having faces curving in the radial direction are connected alternatingly at the outside diameter side and the inside diameter side.

Interconnection of the bellows plates 15 is performed by TIG welding or the like, in atmospheric air or in an Ar gas environment.

In the drawing, the inside diameter side of the bellows 8 is the treatment side, and is at a degree of vacuum of $1\times10^{-6}$ Pa, for example. The outside diameter side of the bellows 8 is the non-treatment side, and is at atmospheric pressure.

The bellows 8 is designed to operate, for example, within a range of about 0.5 L to 1.2 L with respect to the free length L. The expansion and contraction rate during operation reaches 100 mm/s or above.

The bellows 8 is formed from metal material for example, with the upper ring member 11 and the lower ring member 12 being formed of austenitic stainless steel, and the bellows plates 15 being formed of precipitation-hardening semi-austenitic stainless steel.

Figure 3:
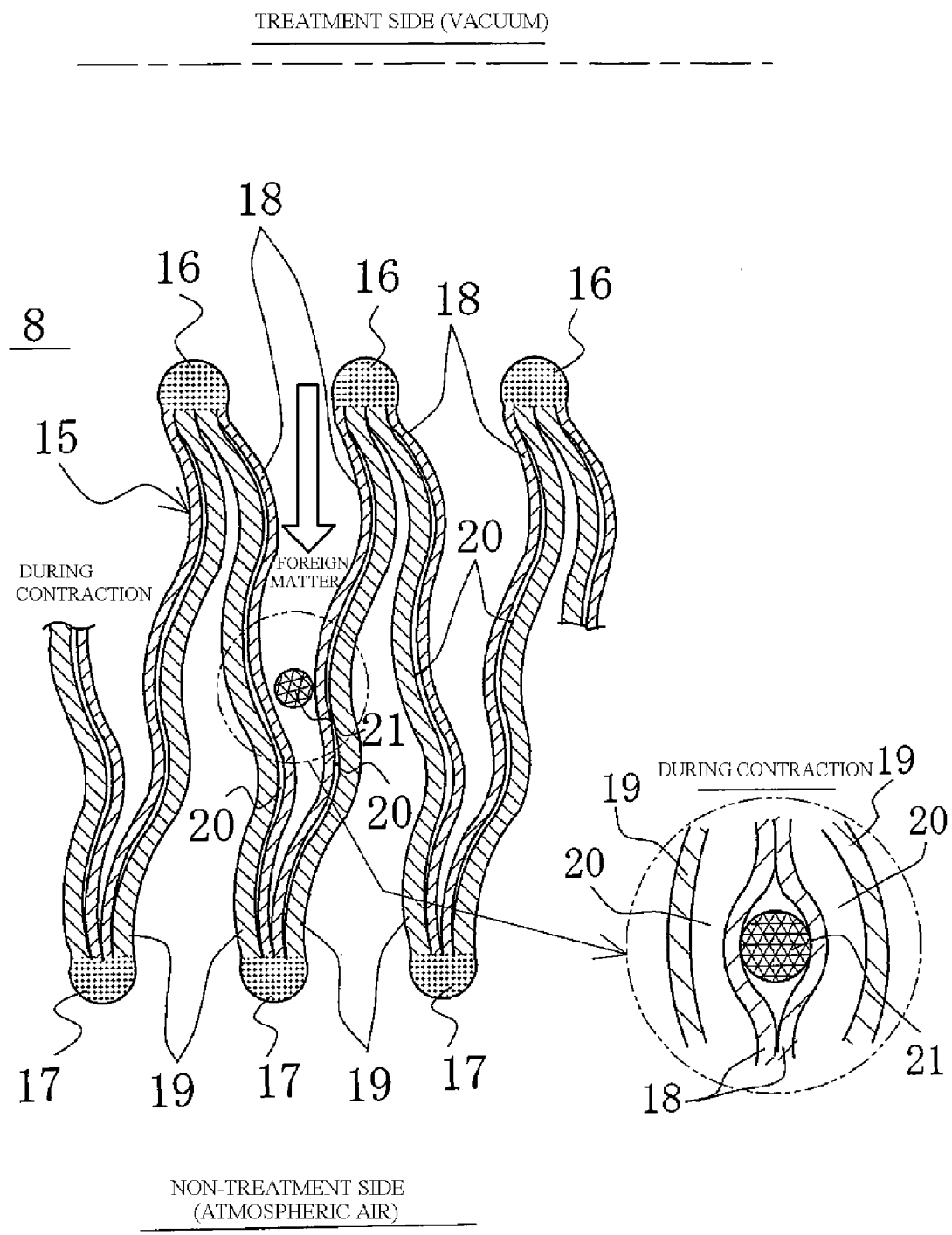
FIG. 3 is a schematic diagram showing a major part of the semiconductor fabrication device welded bellows according to an embodiment of the present invention.
Figure 4:
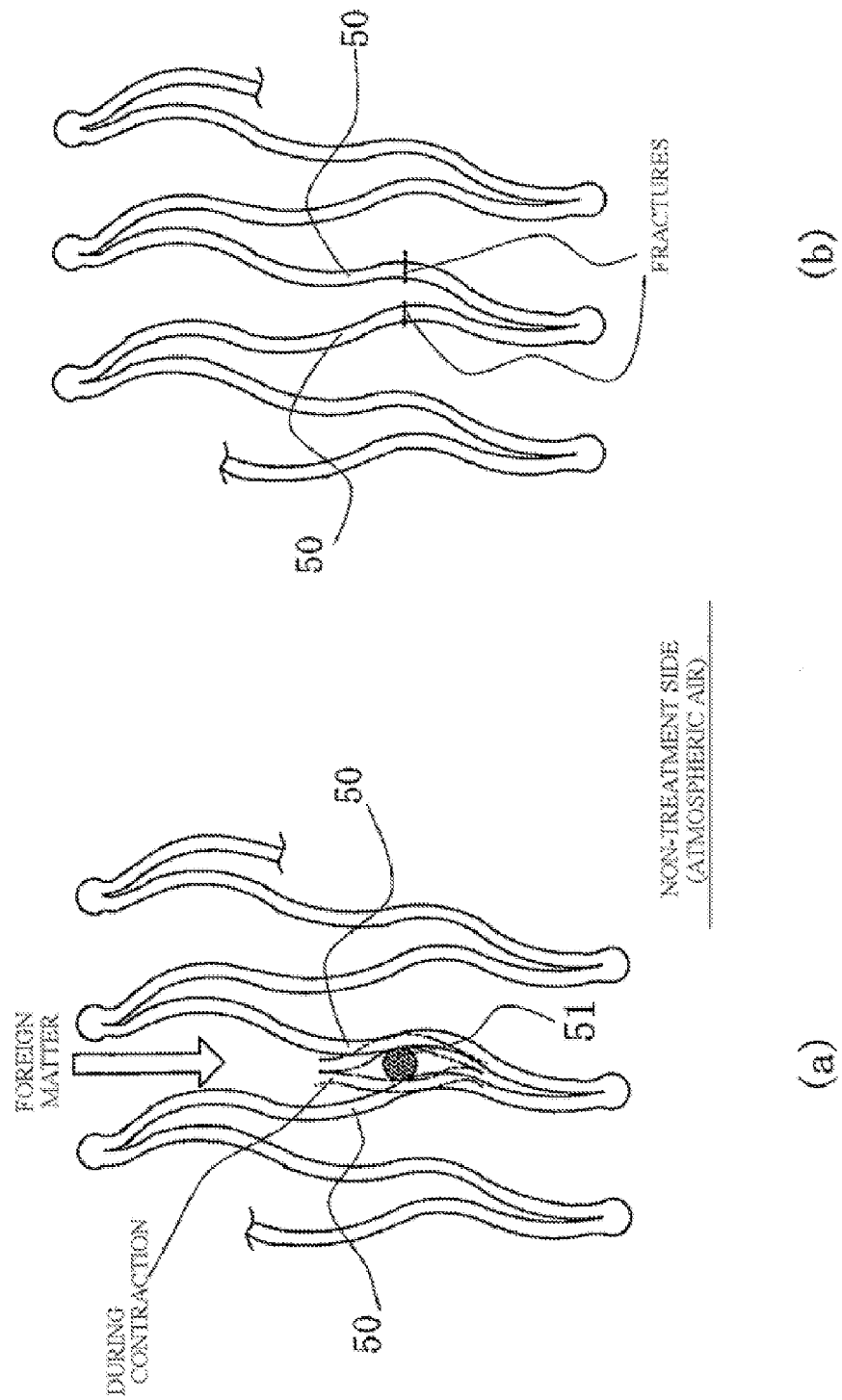
FIG. 4 is a schematic diagram of a major part depicting Prior Art 1.
Figure 5:
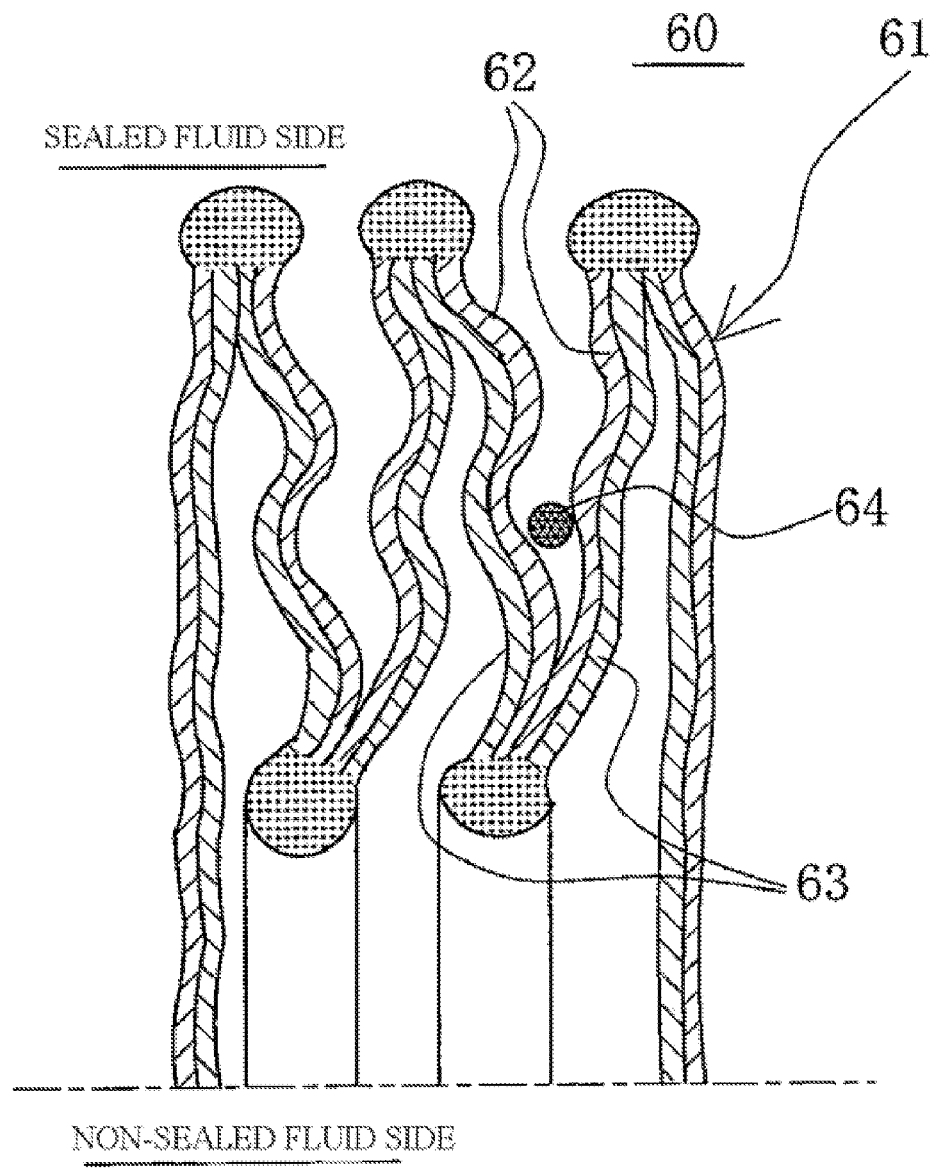
FIG. 5 is a major part cross sectional view depicting Prior Art 2.
Figure 6:
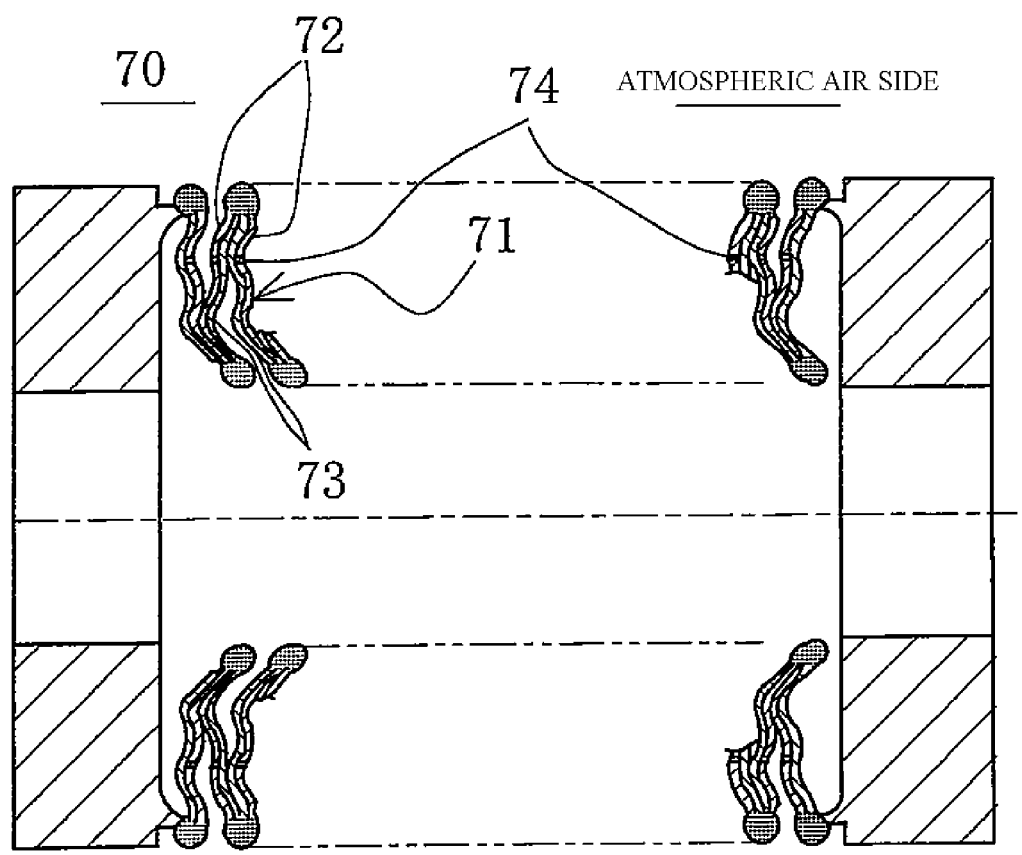
FIG. 6 is a major part cross sectional view depicting Prior Art 3.

FIG. 3 is a schematic diagram showing a major part of the semiconductor fabrication device welded bellows according to the first embodiment of the present invention; the upper side of the drawing is the treatment side (vacuum), and the lower side is the non-treatment side (atmospheric air).

In FIG. 3, the bellows 8 is formed to an accordion structure in which a plurality of annular bellows plates 15 having faces curving in the radial direction are connected alternatingly by welding at the inside diameter side 16 and the outside diameter side 17, the bellows plates 15 comprising double layers of a treatment-side bellows plate 18 and a non-treatment-side bellows plate 19, with a gas layer 20 of air, Ar gas, or the like disposed between the treatment-side bellows plate 18 and the non-treatment-side bellows plate 19. The treatment-side bellows plate 18 is lesser in thickness, and the non-treatment-side bellows plate 19 is greater in thickness. While the thickness of the treatment-side bellows plate 18 and the non-treatment-side bellows plate 19 are established in consideration of operating conditions, the treatment-side bellows plate 18 is required to have, in addition to a sealing function, a function whereby, when foreign matter 21 has infiltrated adjacent bellows plates 15, 15, the plate conforms in a supple manner while contacting the foreign matter. The non-treatment-side bellows plate 19, meanwhile, is required to have a sealing function and the function of a reinforcing member, as well as to retain the sealing function in the unlikely event of a case of failure of the treatment-side bellows plate 18.

In preferred practice, where the plate pressure of the treatment-side bellows plate 18 is t1 and the plate pressure of the non-treatment-side bellows plate 19 is t2, t1/t2 is set to a range of 0.1 to 0.7.

While precipitation-hardening semi-austenitic stainless steel is normally employed as the material for the treatment-side bellows plate 18 and the non-treatment-side bellows plate 19, it is not essential that the plates be of the same material, and materials selected according to their characteristics, for example, mild steel or spring steel for the treatment-side bellows plate 18, and precipitation-hardening semi-austenitic stainless steel for the non-treatment-side bellows plate 19, would be acceptable. It is moreover acceptable for the surface of the exposed side of the treatment-side bellows plate 18 to be coated with a fluororesin or silicone resin, so that the foreign matter 21 does not come into direct contact with the metal surface.

Additionally, the gas layer 20 of air, Ar gas, or the like is formed between the treatment-side bellows plate 18 and the non-treatment-side bellows plate 19. The gas layer 20 is formed by welding together and sealing the bellows plates 18, 19 at the inside diameter side 16 and the outside diameter side 17 in atmospheric air or in an Ar gas environment, while imparting an appropriate gap between the bellows plates 18, 19 during welding.

During expanding and contracting action of the bellows 8 through up and down movement of the support rod 7, the adjacent bellows plates 15, 15 come into close contact and move apart in cyclic fashion. When foreign matter 21 incoming from the treatment side (vacuum) infiltrates the adjacent bellows plates 15, 15, the treatment-side bellows plates 18, 18 are subjected numerous times to cyclical bending deformation with the foreign matter 21 as the fulcrum. At this time, because the treatment-side bellows plates 18 is lesser in thickness, and because the gas layer 20 of air, Ar gas, or the like is present to the back thereof, the plate can conform in a supple manner to foreign matter 21. Moreover, transmission of bending force caused by infiltration of the foreign matter 21 to the non-treatment-side bellows plate 19 is reduced to a considerable extent by the intervening gas layer 20.

In the aforedescribed manner, in the bellows 8 of the present invention, the non-treatment-side bellows plate 19 fulfills the role of a sealing/reinforcing member serving as the primary bellows plate, while the treatment-side bellows plate 18 fulfills the role of a member for sealing and preventing failure of the non-treatment-side bellows plate 19, thereby affording a redundant arrangement provided with double safety measures.

Moreover, during this time, because the treatment-side bellows plate 18 is thinner, and because the gas layer 20 of air, Ar gas, or the like is present to the back thereof, the plate can conform in a supple manner to foreign matter 21, making the plate itself highly resistant to failure; furthermore, due to the intervening gas layer 20, substantially none of the bending deformation caused by the infiltrating foreign matter 21 is transmitted to the non-treatment-side bellows plate 19, and therefore failure of the non-treatment-side bellows plate 19 can be prevented as well.

Furthermore, in the unlikely case that the treatment-side bellows plate 18 experiences failure due to use for an extended period, due to the presence of the thicker, non-treatment-side bellows plate 19, the system can continue to run, while sealing is maintained. In this way, the treatment-side bellows plate 18 is used as a "disposable" sheet material that fulfills the role of preventing failure of the non-treatment-side bellows plate 19.

REFERENCE SIGNS LIST

1 Gate valve
2 Through-hole
3 Valve box
4 Valve plate
5 Valve plate
6 Valve assembly
7 Support rod
8 Bellows
9 Air cylinder
10 O-ring 11 Upper ring member
12 Lower ring member
13 O-ring
15 Bellows plate
16 Bellows plate inside diameter side
17 Bellows plate outside diameter side
18 Treatment-side bellows plate
19 Non-treatment-side bellows plate
20 Gas layer
21 Foreign matter
S1, S2 Vacuum treatment chamber
G Gate

The invention claimed is:

1. A semiconductor fabrication device welded bellows of an accordion structure in which a plurality of annular bellows plates having faces curving in the radial direction are connected alternatingly at the outside diameter side and inside diameter side, the semiconductor fabrication device welded bellows characterized in that the annular bellows plates are provided with a treatment-side bellows plate and a non-treatment-side bellows plate, a gas layer being disposed between the two plates, the treatment-side bellows plate being of lesser thickness, and the non-treatment-side bellows plate being of greater thickness.

2. The semiconductor fabrication device welded bellows according to claim 1, characterized in that the treatment side is a vacuum, and the non-treatment side is atmospheric air.

3. The semiconductor fabrication device welded bellows according to claim 1, characterized by being employed for sealing a gate valve capable of airtightly opening and closing an aperture of a vacuum treatment chamber employed in a fabrication step of a semiconductor fabrication device.

4. The semiconductor fabrication device welded bellows according to any of claim 1, characterized in undergoing an action of expansion and contraction over several hertz, the expansion-contraction rate being 100 mm/sec or greater, and the cycle life being $1\times10^6$ or more.

5. The semiconductor fabrication device welded bellows according to claim 2, characterized by being employed for sealing a gate valve capable of airtightly opening and closing an aperture of a vacuum treatment chamber employed in a fabrication step of a semiconductor fabrication device.

6. The semiconductor fabrication device welded bellows according to claim 2, characterized in undergoing an action of expansion and contraction over several hertz, the expansion-contraction rate being 100 mm/sec or greater, and the cycle life being $1\times10^6$ or more.

7. The semiconductor fabrication device welded bellows according to claim 3, characterized in undergoing an action of expansion and contraction over several hertz, the expansion-contraction rate being 100 mm/sec or greater, and the cycle life being $1\times10^6$ or more.

8. The semiconductor fabrication device welded bellows according to claim 5, characterized in undergoing an action of expansion and contraction over several hertz, the expansion-contraction rate being 100 mm/sec or greater, and the cycle life being $1\times10^6$ or more.

* * * * *